US012107336B2

(12) United States Patent
Tai et al.

(10) Patent No.: US 12,107,336 B2
(45) Date of Patent: Oct. 1, 2024

(54) BROADBAND LINEAR POLARIZATION ANTENNA STRUCTURE

(71) Applicant: TMY Technology Inc., Taipei (TW)

(72) Inventors: Yang Tai, Hsinchu County (TW); Shun-Chung Kuo, Miaoli County (TW); Wen-Tsai Tsai, Hsinchu (TW); An-Ting Hsiao, Hsinchu County (TW); Wei-Yang Chen, Taipei (TW); Jiun-Wei Wu, Taipei (TW)

(73) Assignee: TMY Technology Inc., New Taipei (TW)

( * ) Notice: Subject to any disclaimer, the term of this patent is extended or adjusted under 35 U.S.C. 154(b) by 17 days.

(21) Appl. No.: 17/474,069

(22) Filed: Sep. 14, 2021

(65) Prior Publication Data

US 2022/0158358 A1 May 19, 2022

Related U.S. Application Data

(60) Provisional application No. 63/115,570, filed on Nov. 18, 2020.

(30) Foreign Application Priority Data

Mar. 30, 2021 (TW) .................................. 110111571

(51) Int. Cl.

| | |
|---|---|
| ***H01Q 21/06*** | (2006.01) |
| ***H01Q 9/04*** | (2006.01) |
| ***H01Q 21/24*** | (2006.01) |

(52) U.S. Cl.

CPC ......... *H01Q 21/065* (2013.01); *H01Q 9/0421* (2013.01); *H01Q 21/24* (2013.01)

(58) Field of Classification Search

CPC ..... H01Q 21/065; H01Q 9/0421; H01Q 21/24

(Continued)

(56) References Cited

U.S. PATENT DOCUMENTS

| | | | | |
|---|---|---|---|---|
| 4,827,271 | A * | 5/1989 | Berneking ............. | H01Q 5/378 343/846 |
| 6,995,709 | B2 | 2/2006 | Spittler | |

(Continued)

FOREIGN PATENT DOCUMENTS

| | | |
|---|---|---|
| CN | 101136503 | 3/2008 |
| CN | 101141023 | 3/2008 |

(Continued)

OTHER PUBLICATIONS

H. Nakano et al., “A theoretical investigation of the two-wire round spiral antenna—Archimedian type,” 1979 Antennas and Propagation Society International Symposium, Jun. 18-22, 1979, pp. 387-390.

(Continued)

*Primary Examiner* — Hoang V Nguyen
*Assistant Examiner* — Brandon Sean Woods
(74) *Attorney, Agent, or Firm* — JCIPRNET

(57) ABSTRACT

A broadband linear polarization antenna structure, including a reference conductive layer, a first patch antenna, a second patch antenna, and a feeding portion, is provided. The reference conductive layer includes through holes. A first short pin is connected between the reference conductive layer and the first patch antenna, and a second short pin is connected between the first patch antenna and the second patch antenna. Each feeding portion penetrates the reference conductive layer through the through hole and is coupled to the first patch antenna.

21 Claims, 16 Drawing Sheets

(58) Field of Classification Search
USPC .......................................................... 343/702
See application file for complete search history.

(56) References Cited

U.S. PATENT DOCUMENTS

| | | | | |
|---|---|---|---|---|
| 10,205,240 | B2 * | 2/2019 | McMichael | H01Q 9/0435 |
| 10,741,933 | B2 * | 8/2020 | Yong | H01Q 21/24 |
| 10,879,611 | B2 * | 12/2020 | Sugimoto | H01Q 9/0407 |
| 2009/0091498 | A1 | 4/2009 | Chen et al. | |
| 2013/0278467 | A1 | 10/2013 | Dassano et al. | |
| 2015/0207222 | A1 | 7/2015 | Kim et al. | |
| 2017/0062935 | A1 | 3/2017 | Ganchrow | |
| 2017/0093042 | A1 * | 3/2017 | McMichael | H01Q 9/0428 |

FOREIGN PATENT DOCUMENTS

| | | | | |
|---|---|---|---|---|
| CN | 102074796 | | 5/2011 | |
| CN | 104993238 | | 10/2015 | |
| CN | 106252858 | | 12/2016 | |
| CN | 106469848 | | 3/2017 | |
| CN | 207818899 | | 9/2018 | |
| CN | 109378576 | | 6/2020 | |
| CN | 211428342 | | 9/2020 | |
| EP | 0270209 | | 6/1988 | |
| EP | 1210746 | | 11/2011 | |
| EP | 2659546 | A1 * | 11/2013 | B60C 23/0433 |
| EP | 2659546 | B1 * | 3/2017 | B60C 23/0433 |
| JP | 2003309424 | | 10/2003 | |
| JP | 2003309424 | A * | 10/2003 | |
| JP | 2007036930 | | 2/2007 | |
| TW | 518802 | | 1/2003 | |
| TW | 202023109 | | 6/2020 | |

OTHER PUBLICATIONS

M. Secmen et al., "A dielectric corrugated feed horn antenna for satellite communication applications," Microwave and Optical Technology Letters, vol. 52, No. 8, Aug. 2010, pp. 1709-1713.
A. J. Abumunshar et al., "5:1 Bandwidth Dielectric Rod Antenna Using a Novel Feed Structure," in IEEE Transactions on Antennas and Propagation, vol. 65, No. 5, May 2017, pp. 1-8.
Jacinto Barreiros et al., "Microstrip Patch Antenna for GSM 1800 Handsets", IEEE Antennas and Propagation Society International Symposium. 1999 Digest. Held in conjunction with: USNC/URSI National Radio Science Meeting (Cat. No.99CH37010), Jul. 11, 1999, pp. 2074-2077.
"Search Report of Europe Counterpart Application", issued on Nov. 19, 2021, p. 1-p. 10.
"Office Action of Taiwan Counterpart Application", issued on Jan. 7, 2022, p. 1-p. 6.
"Office Action of China Counterpart Application", issued on Jan. 4, 2024, p. 1-p. 9.
"Notice of allowance of China Counterpart Application", issued on Jul. 24, 2024, p. 1-p. 4.
"Office Action of China Counterpart Application", issued on May 20, 2024, p. 1-p. 5.

* cited by examiner

BROADBAND LINEAR POLARIZATION ANTENNA STRUCTURE

CROSS-REFERENCE TO RELATED APPLICATION

This application claims the priority benefit of U.S. Provisional Application No. 63/115,570, filed on Nov. 18, 2020, and Taiwan Application No. 110111571, filed on Mar. 30, 2021. The entirety of each of the above-mentioned patent applications is hereby incorporated by reference herein and made a part of this specification.

BACKGROUND

Technical Field

The disclosure relates to an antenna structure, and more particularly to a broadband linear polarization antenna structure.

Description of Related Art

With the development of science and technology, the dual polarization array transceiver system is the key technology for the next generation of the 5-th generation (hereinafter referred to as 5G) communication system. The dual polarization antenna integrates two vertical polarization and horizontal polarization receiving antennas into the same structure, which may reduce the complexity of the wiring between the power amplifier and the antenna, reduce energy loss, and reduce the area of the module. In addition, if the dual polarization antenna is combined with the control of the back-end active system (such as a phase control chip with complete phase and amplitude control functions), the signal may be switched between effects such as single polarization, dual polarization, and circular polarization, or the capacity and spectrum utilization of the communication system may be exponentially increased without increasing the bandwidth, thereby improving the range and coverage of the millimeter wave signal.

In order to save circuit space and improve heat dissipation, dual polarization antenna arrays have been developed in recent years and integrated with multi-port phase control chip modules, so that the horizontal and vertical polarization transceivers share one array antenna, thereby improving the range and coverage of the millimeter wave signal.

Since the patch antenna has the advantages of simple structure, simple polarization, unidirectional vertical radiation, etc., the patch antenna has become a commonly used antenna unit in the line array technology today. Since the patch antenna does not perform well in the impedance bandwidth, persons skilled in the art have tried to achieve a wider frequency response through changing the shape of the radiator, but the radiation characteristic of the main mode cannot be maintained.

SUMMARY

The disclosure provides a broadband linear polarization antenna structure, which can be configured to solve the above technical issues.

The disclosure provides a broadband linear polarization antenna structure, which includes a reference conductive layer, a first patch antenna, a second patch antenna, and a feeding portion. The reference conductive layer includes at least one through hole. At least one first short pin is connected between the reference conductive layer and the first patch antenna, and at least one second short pin is connected between the first patch antenna and the second patch antenna. Each feeding portion penetrates the reference conductive layer through the at least one through hole and is coupled to the first patch antenna.

DETAILED DESCRIPTION OF DISCLOSED EMBODIMENTS

Figure 1:
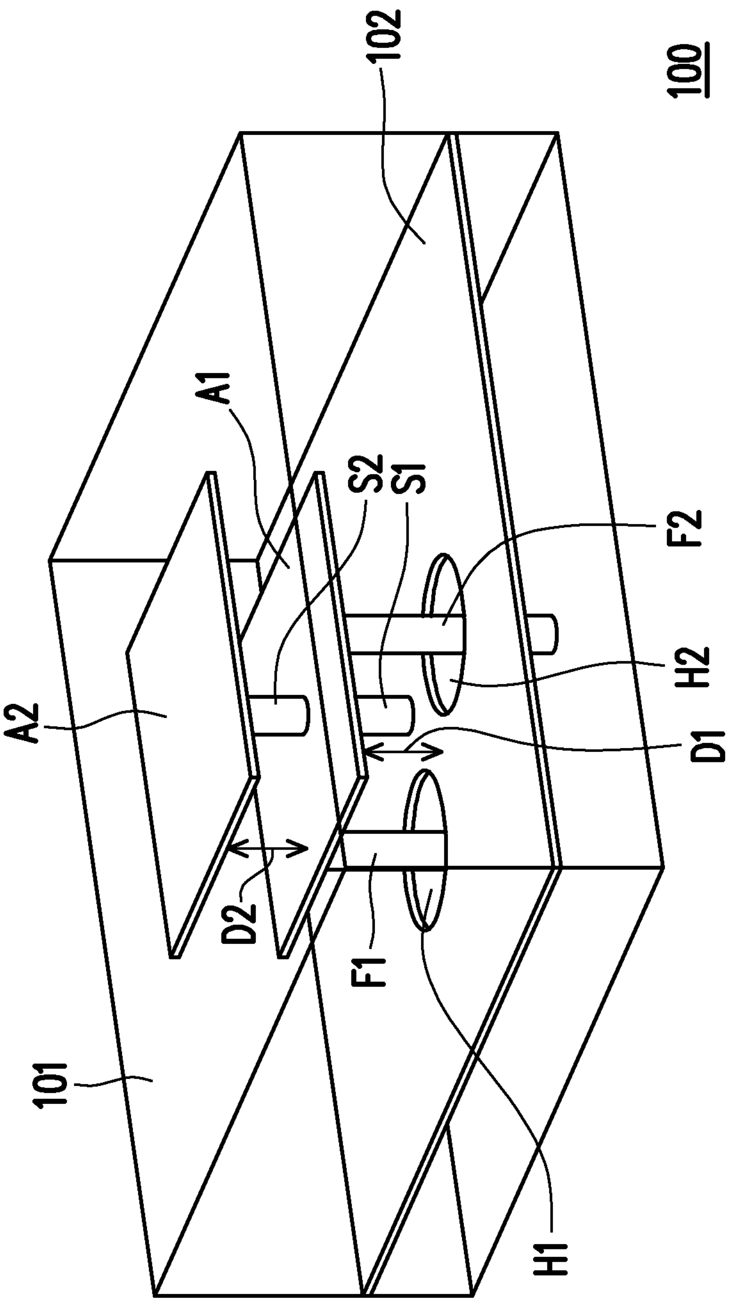
FIG. 1 is a schematic diagram of a broadband linear polarization antenna structure according to an embodiment of the disclosure.

Please refer to FIG. 1, which is a schematic diagram of a broadband linear polarization antenna structure according to an embodiment of the disclosure. In FIG. 1, a broadband linear polarization antenna structure 100 includes a reference conductive layer 102, a first patch antenna A1, a second patch antenna A2, and feeding portions F1 and F2. In an embodiment, the broadband linear polarization antenna structure 100 may further include a substrate 101, and the reference conductive layer 102, the first patch antenna A1, the second patch antenna A2, and the feeding portions F1 and F2 may be disposed on the substrate 101, but not limited thereto. In some embodiments, the reference conductive layer 102 may be a layer connected with a reference voltage source providing a reference voltage. In the embodiment where the reference voltage is 0V, the reference conductive layer 102 may be understood as a ground layer, but the disclosure is not limited thereto.

As shown in FIG. 1, the reference conductive layer 102 includes through holes H1 and H2. The through holes H1 and H2 may respectively correspond to the feeding portions F1 and F2. In an embodiment, the feeding portion F1 may penetrate the reference conductive layer 102 through the through hole H1 and be coupled to the first patch antenna A1. In addition, the feeding portion F2 may penetrate the reference conductive layer 102 through the through hole H2 and be coupled to the first patch antenna A1.

In an embodiment, the feeding portions F1 and F2 may respectively receive a first feeding signal and a second feeding signal, and the first feeding signal may be orthogonal to the second feeding signal. For example, the first feeding signal is, for example, a horizontal polarization signal, and the second feeding signal is, for example, a vertical polarization signal, but not limited thereto. In different embodiments, the feeding portions F1 and F2 may include microstrip lines or coaxial feeding lines. The structure of the microstrip line is simple, and the coaxial feeding line may suppress line radiation. In this case, combined with a beamforming chip module, the broadband linear polarization antenna structure 100 may implement operations such as single polarization, dual polarization, multi-polarization, and circular polarization. In some embodiments, the feeding portions F1 and F2 may be vertically, horizontally, or obliquely coupled to the first patch antenna A1, but not limited thereto.

In FIG. 1, a first short pin S1 is connected between the reference conductive layer 102 and the first patch antenna A1, and a second short pin S2 is connected between the first patch antenna A1 and the second patch antenna A2.

In an embodiment, the first patch antenna A1 and the second patch antenna A2 may be parallel to each other, and the reference conductive layer 102 may be parallel to the first patch antenna A1. In other words, the first patch antenna A1, the second patch antenna A2, and the reference conductive layer 102 may be parallel to each other, but not limited thereto. In addition, the first patch antenna A1 may be disposed between the reference conductive layer 102 and the second patch antenna A2, but not limited thereto.

In addition, the first short pin S1 and the second short pin S2 may be perpendicular to the first patch antenna A1. In other words, the first short pin S1 and the second short pin S2 may be understood to be also perpendicular to the second patch antenna A2 and the reference conductive layer 102, but not limited thereto.

In addition, although only one first short pin S1 is shown in FIG. 1, in some embodiments, multiple first short pins S1 may also be connected between the reference conductive layer 102 and the first patch antenna A1, and the distance between the first short pins S1 may be less than a distance threshold. Similarly, although only one second short pin S2 is shown in FIG. 1, in some embodiments, multiple second short pins S2 may also be connected between the first patch antenna A1 and the second patch antenna A2, and the distance between the second short pin sS2 may be less than the distance threshold, but not limited thereto.

In different embodiments, the first short pin S1 may be connected to any position of the first patch antenna A1. In a preferred embodiment, the first short pin S1 may be connected to a virtual ground of the first patch antenna A1. Similarly, the second short pin S2 may be connected to any position of the second patch antenna A2. In a preferred embodiment, the second short pin S2 may be connected to a virtual ground of the second patch antenna A2. In some embodiments, the first short pin S1 may be aligned with the second short pin S2, but not limited thereto.

In other embodiments, the number of the first short pin S1 connected between the reference conductive layer 102 and the first patch antenna A1 may be the same as or different from the number of the second short pin S2 connected between the first patch antenna A1 and the second patch antenna A2.

In addition, each of the first patch antenna A1 and the second patch antenna A2 has a complete patch metal surface, and the shape of each of the first patch antenna A1 and the second patch antenna A2 may be implemented as a circular structure or a polygonal structure according to the requirements of the designer. In addition, the size of each of the first patch antenna A1 and the second patch antenna A2 may also be adjusted according to the respective required resonance frequencies. That is, the size of the first patch antenna A1 may correspond to a first resonance frequency of the first patch antenna A1, and the size of the second patch antenna A2 may correspond to a second resonance frequency of the second patch antenna A2, but not limited thereto.

In some embodiments, when the first patch antenna A1 and the second patch antenna A2 are excited, the broadband linear polarization antenna structure 100 may generate multimode resonance to synthesize a broadband response. In addition, in other embodiments, the designer may stack other patch antennas on the second patch antenna A2 to achieve a wider frequency response, but not limited thereto.

In some embodiments, there may be a first distance D1 between the first patch antenna A1 and the reference conductive layer 102, there may be a second distance D2 between the first patch antenna A1 and the second patch antenna A2, and the first distance D1 may be equal to or not equal to the second distance D2.

In some embodiments, the first distance D1 and the second distance D2 may be adjusted according to size requirements of a printed circuit board (PCB). Increasing D1 and D2 can both effectively increase the impedance bandwidth and radiation efficiency of the antenna, but not limited thereto.

In the embodiment of the disclosure, through disposing the first short pin S1 and the second short pin S2, the impedance of the broadband linear polarization antenna structure 100 may be effectively adjusted, so that the broadband linear polarization antenna structure 100 may implement the operation of dual polarization. In addition, since the first patch antenna A1 and the second patch antenna A2 have complete patch metal surfaces, the broadband linear polarization radiation characteristic can be maintained, which is fairly practical for the dual polarization array transceiver system today.

Figure 2:
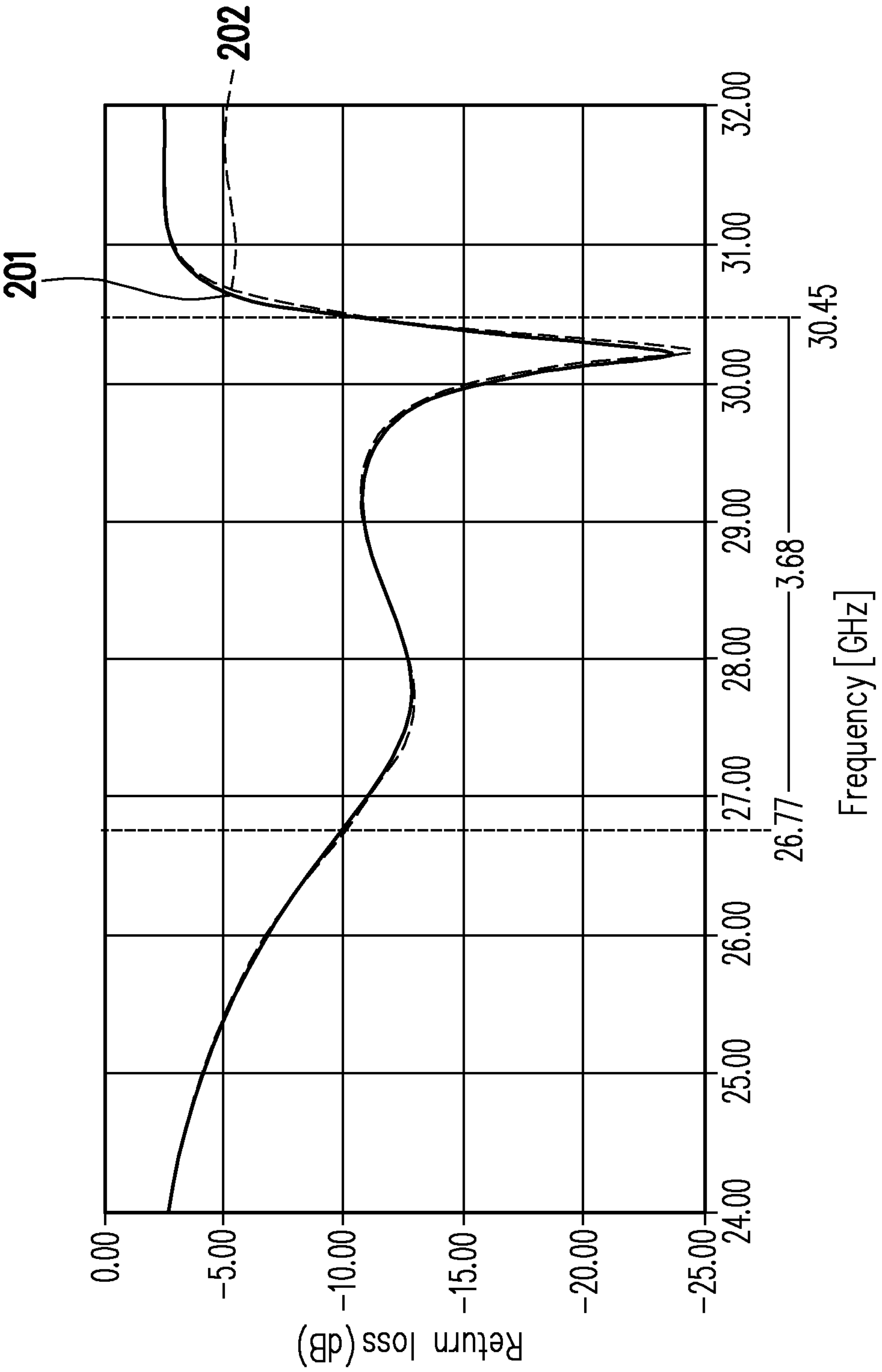
FIG. 2 is a return loss (RL' or $s_{11,\ dB}$) diagram of the broadband linear polarization antenna structure according to FIG. 1.

Please refer to FIG. 2, which is a return loss (RL' or $s_{11,\ dB}$) diagram of the broadband linear polarization antenna structure according to FIG. 1. In the embodiments of the disclosure, the considered return loss is the ratio of reflected to incident power, which may be known as RL' or $s_{11,\ dB}$. In this case, the signs of the return losses discussed in the disclosure is negative. In FIG. 2, curves 201 and 202, for example, respectively correspond to the horizontal polarization and the vertical polarization of the broadband linear polarization antenna structure 100. It can be seen from FIG. 2 that the curves 201 and 202 have almost the same trend, and the frequency bands of the two below 10 dB (the frequency bands that meet the impedance matching condition) are about 26.77 GHz to 30.45 GHz. It can be seen that the broadband linear polarization antenna structure 100 of the disclosure is suitable for application in a 5G millimeter wave system (with the application frequency band of about 25 GHz to 30 GHz), but not limited thereto.

Figure 3A:
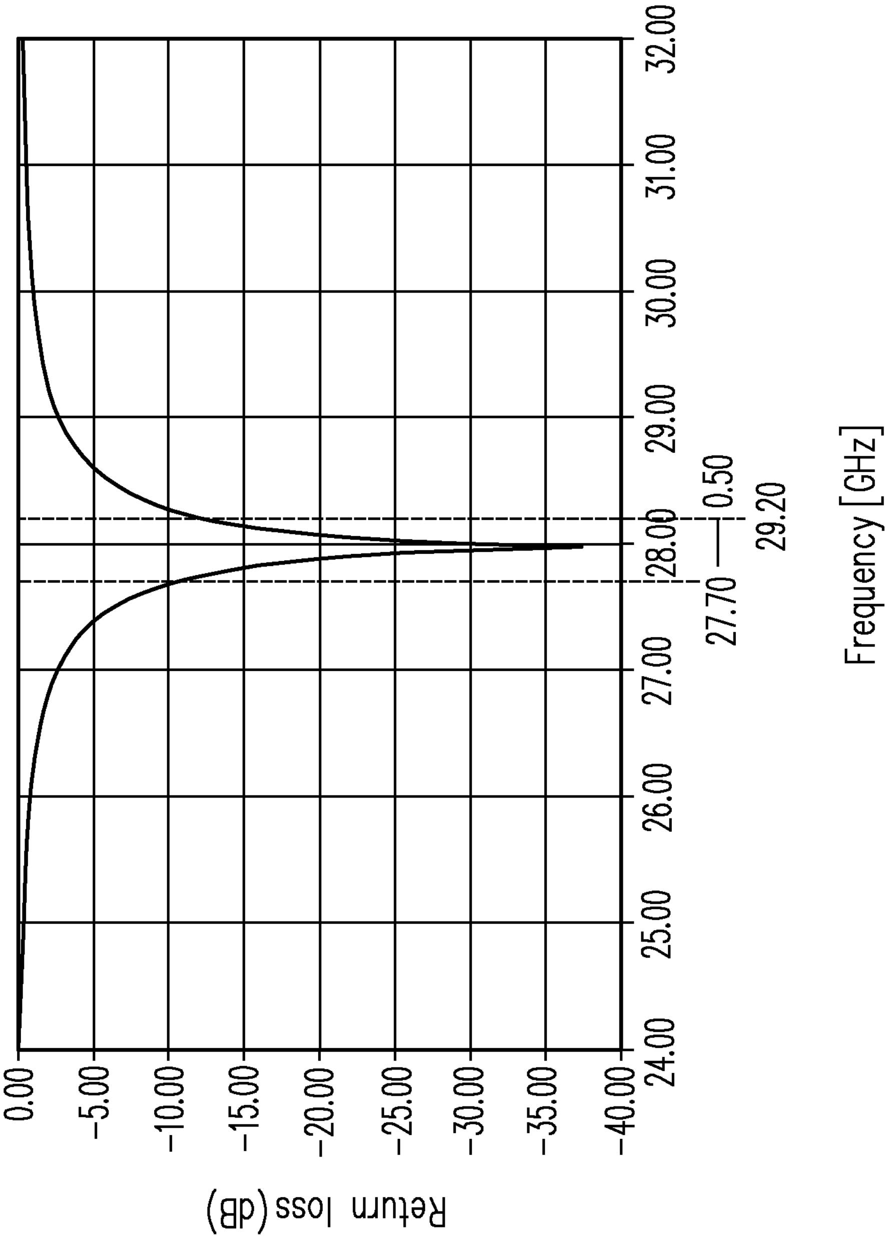
FIG. 3A is a return loss (RL' or $s_{11,\ dB}$) diagram of a conventional antenna structure.
Figure 3B:
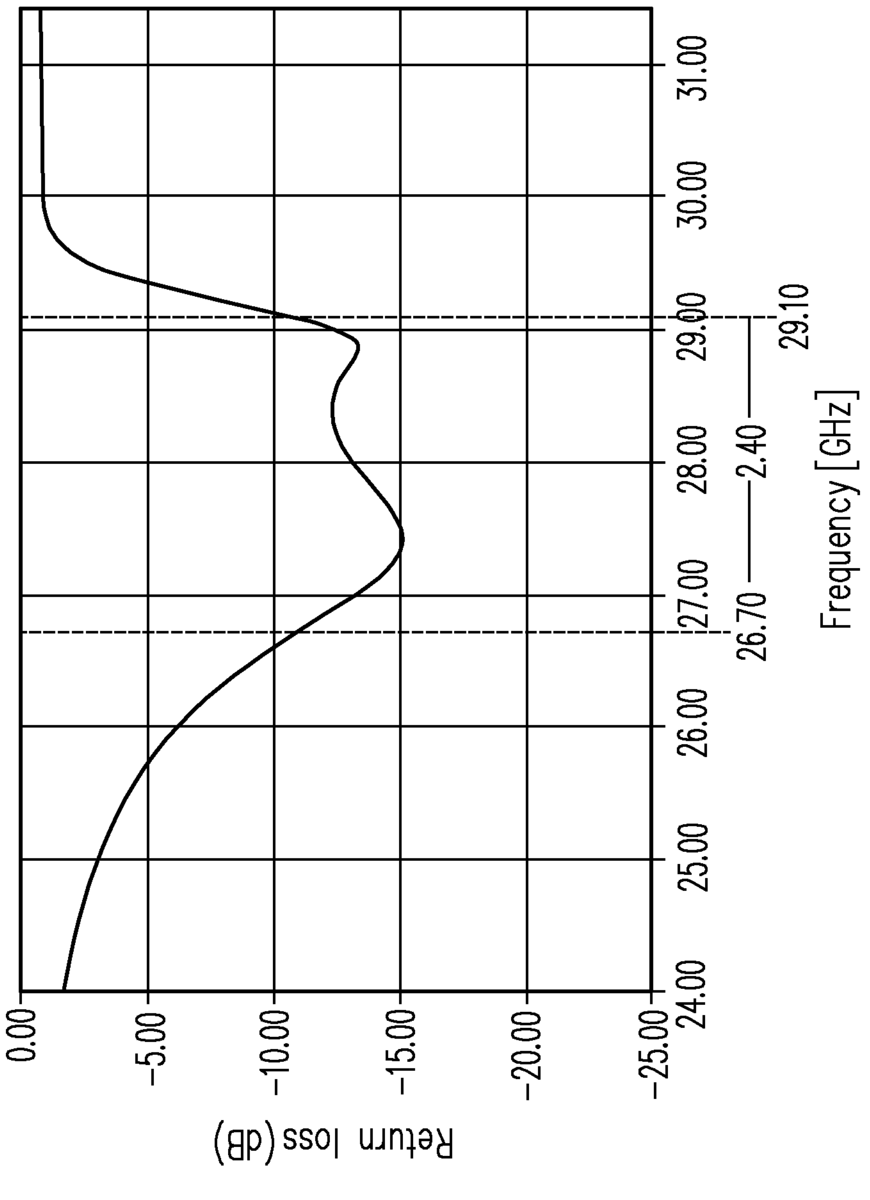
FIG. 3B is a return loss (RL' or $s_{11,\ dB}$) diagram of the broadband linear polarization antenna structure of the disclosure.

Please refer to FIG. 3A and FIG. 3B. FIG. 3A is a return loss (RL' or $s_{11,\ dB}$) diagram of a conventional antenna structure, and FIG. 3B is a return loss (RL' or $s_{11,\ dB}$) diagram of the broadband linear polarization antenna structure of the disclosure. It can be seen from FIG. 3A that the frequency response of the conventional antenna structure is fairly narrow, so the conventional antenna structure is not suitable for application in a 5G millimeter wave system. In contrast, since the broadband linear polarization antenna structure 100 of the disclosure may synthesize a wider frequency response (with the bandwidth percentage of about 20% to 30%) by the resonance modes of the first patch antenna A1 and the second patch antenna A2, the broadband linear polarization antenna structure 100 is more suitable for application in a 5G millimeter wave system. In addition, the broadband linear polarization antenna structure 100 of the disclosure has higher tolerance for process variation and processing errors.

Figure 4:
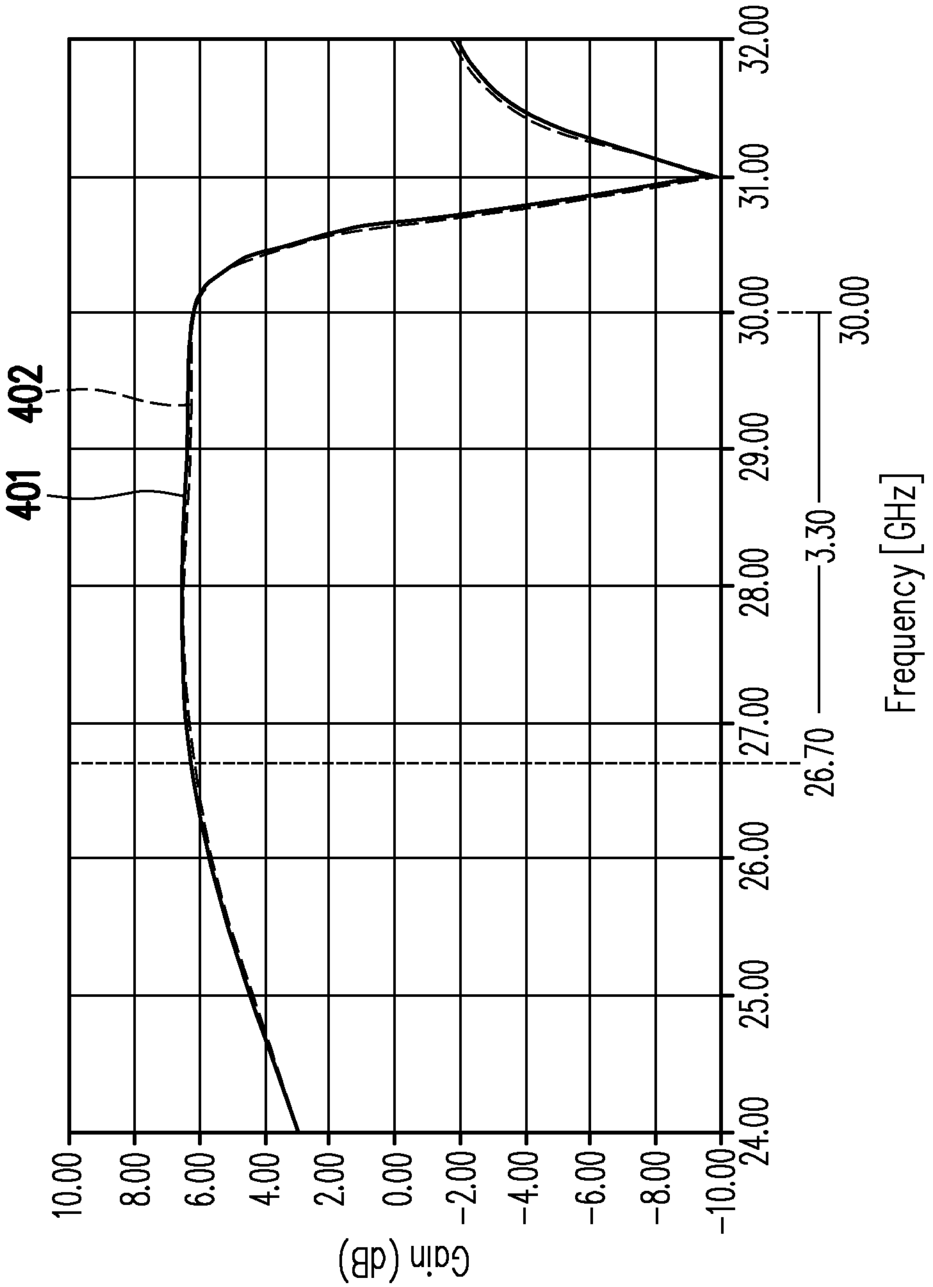
FIG. 4 is a schematic diagram of an antenna gain of the broadband linear polarization antenna structure of the disclosure.

Please refer to FIG. 4, which is a schematic diagram of an antenna gain of the broadband linear polarization antenna structure of the disclosure. In FIG. 4, curves 401 and 402, for example, respectively correspond to the horizontal polarization and the vertical polarization of the broadband linear polarization antenna structure 100. It can be seen from FIG. 4 that the horizontal polarization and the vertical polarization of the broadband linear polarization antenna structure 100 of the disclosure may both have the broadband gain operation characteristic.

Figure 5A:
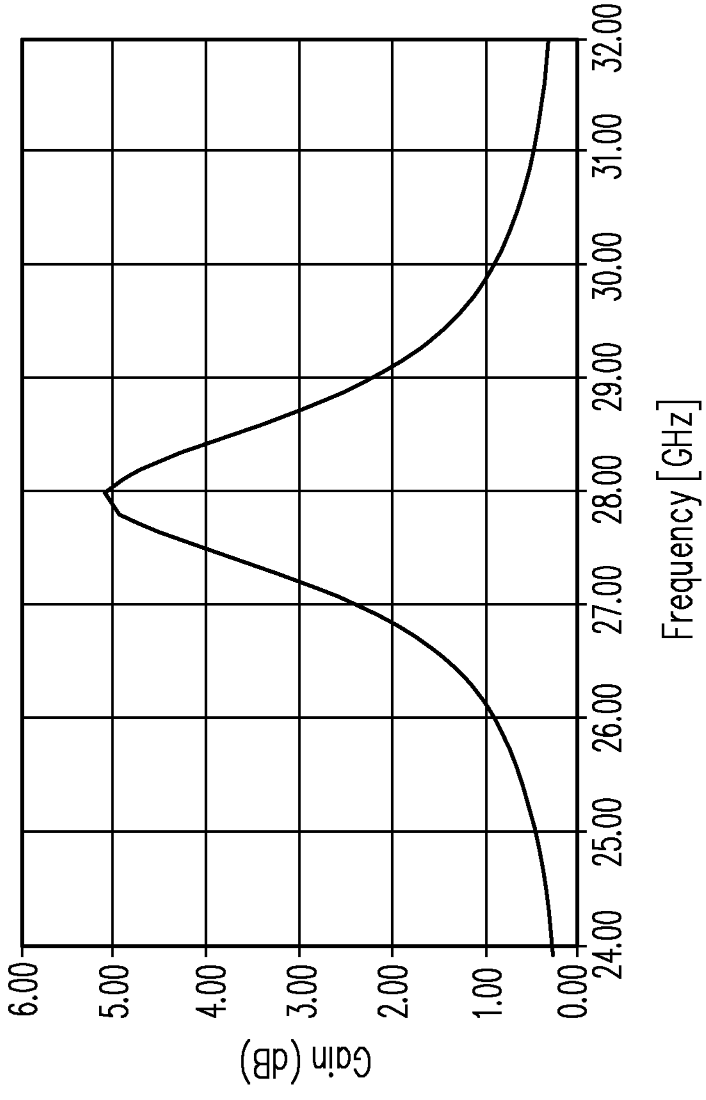
FIG. 5A is a schematic diagram of an antenna gain of the conventional antenna structure.
Figure 5B:
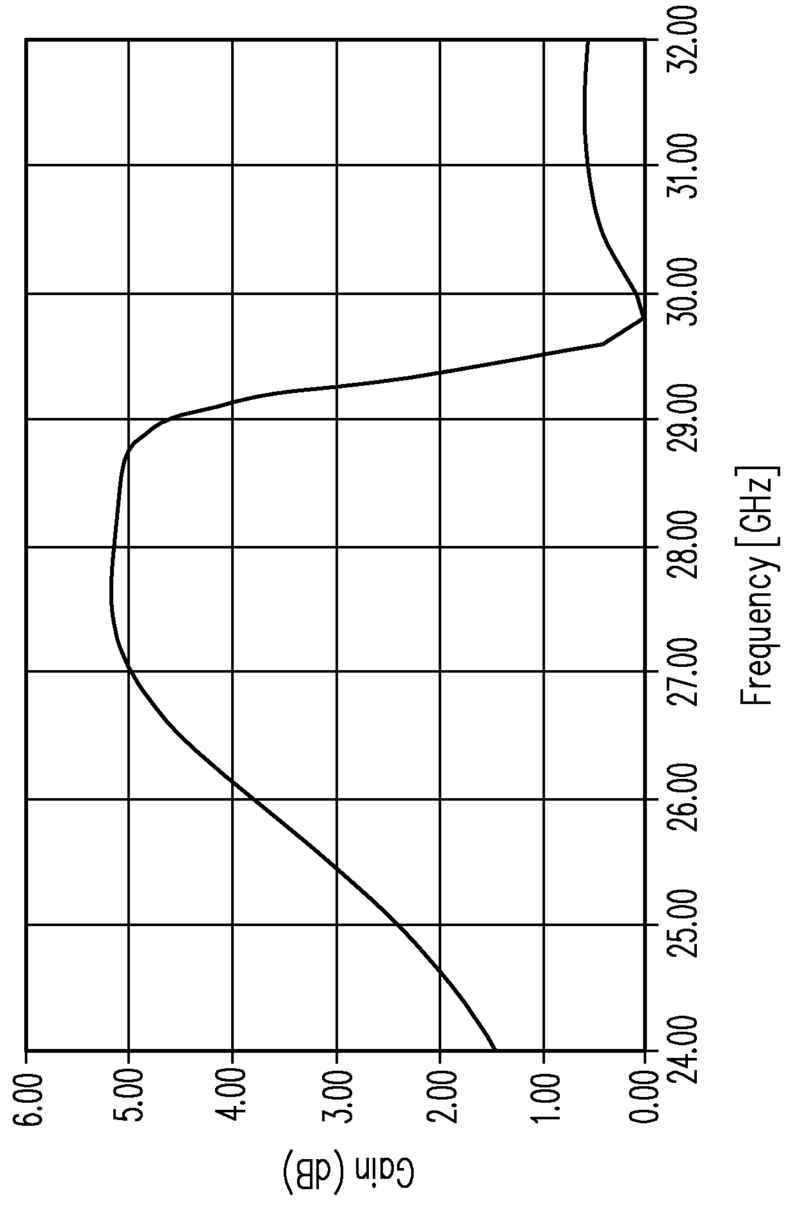
FIG. 5B is a schematic diagram of the antenna gain of the broadband linear polarization antenna structure of the disclosure.

Please refer to FIG. 5A and FIG. 5B. FIG. 5A is a schematic diagram of an antenna gain of the conventional antenna structure, and FIG. 5B is a schematic diagram of the antenna gain of the broadband linear polarization antenna structure of the disclosure. It can be seen from FIG. 5A that the conventional antenna structure attenuates faster in frequency bands other than the main mode, so the conventional antenna structure is not suitable for application in a 5G millimeter wave system. In contrast, the broadband linear polarization antenna structure 100 of the disclosure can maintain the required gain in the entire operating bandwidth, so the broadband linear polarization antenna structure 100 is more suitable for application in a 5G millimeter wave system.

Figure 6:
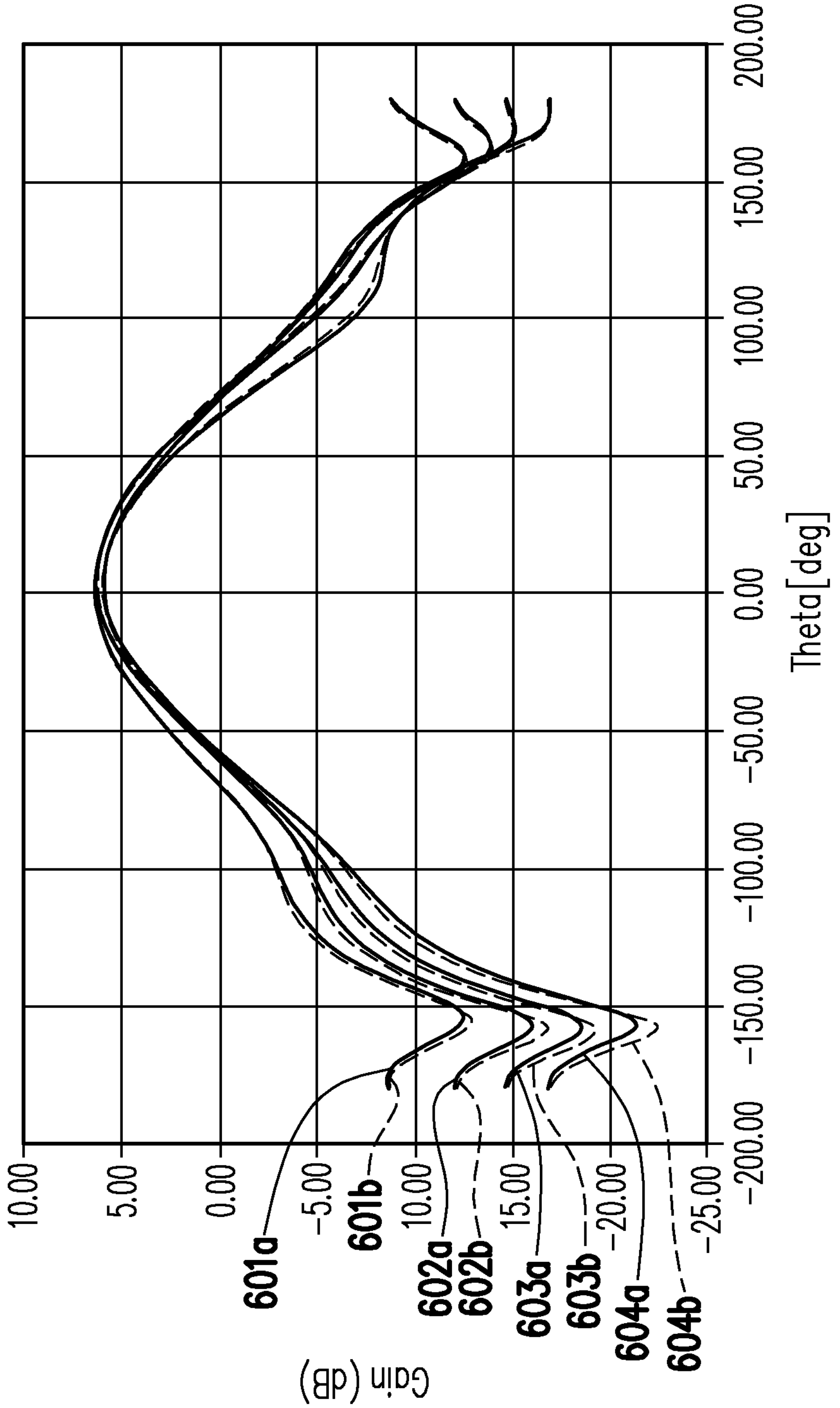
FIG. 6 is a schematic diagram of a radiation field pattern according to FIG. 1.

Please refer to FIG. 6, which is a schematic diagram of a radiation field pattern according to FIG. 1. In FIG. 6, it is assumed that the center frequency of the broadband linear polarization antenna structure 100 is about 28 GHz, and curves 601*a* and 601*b* are respectively a horizontal polarization field pattern and a vertical polarization field pattern corresponding to a first frequency (for example, 27 GHz); curves 602*a* and 602*b* are respectively a horizontal polarization field pattern and a vertical polarization field pattern corresponding to a second frequency (for example, 28 GHz); curves 603*a* and 603*b* are respectively a horizontal polarization field pattern and a vertical polarization field pattern corresponding to a third frequency (for example, 29 GHz); and curves 604*a* and 604*b* are respectively a horizontal polarization field pattern and a vertical polarization field pattern corresponding to a fourth frequency (for example, 30 GHz).

It can be seen from FIG. 6 that regardless of the frequency, the characteristics of the two main polarizations of the broadband linear polarization antenna structure 100 of the disclosure are fairly close. For example, the main beam widths of the curves 601*a* and 601*b* are close to each other, the main beam widths of the curves 602*a* and 602*b* are close to each other, and so on. It can be seen that the broadband linear polarization antenna structure 100 of the disclosure is suitable for application in a dual polarization array transceiver system.

From another point of view, it can be seen from FIG. 6 that the broadband linear polarization antenna structure 100 of the disclosure not only has a good radiation field pattern at the center frequency (that is, 28 GHz), but also has good radiation field patterns at other frequencies. In contrast, the traditional antenna structure can only have an acceptable radiation field pattern at the center frequency, but cannot have a good radiation field pattern at other frequencies.

Figure 7A:
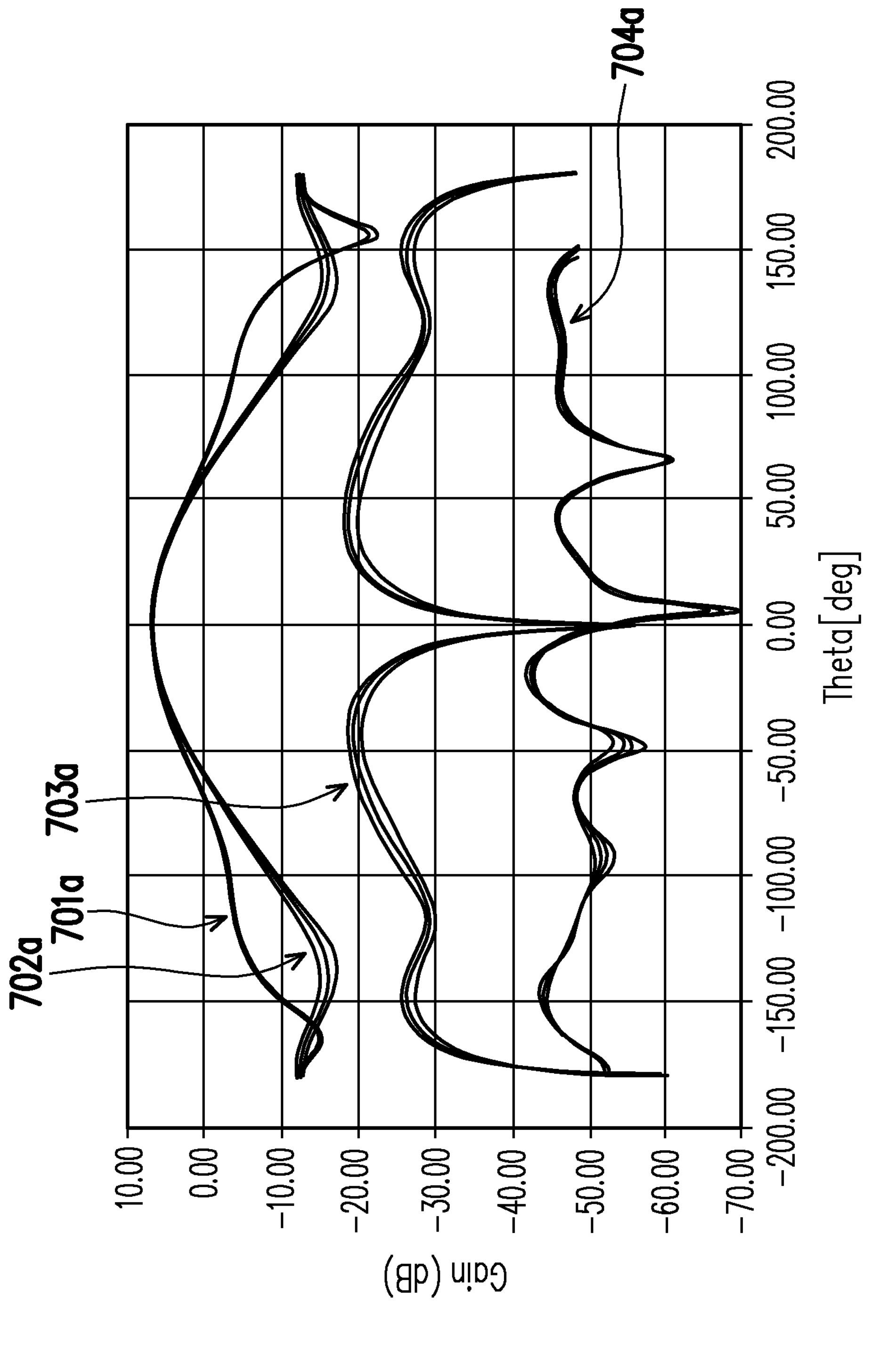
FIG. 7A is a schematic diagram of a radiation field pattern of the conventional antenna structure.
Figure 7B:
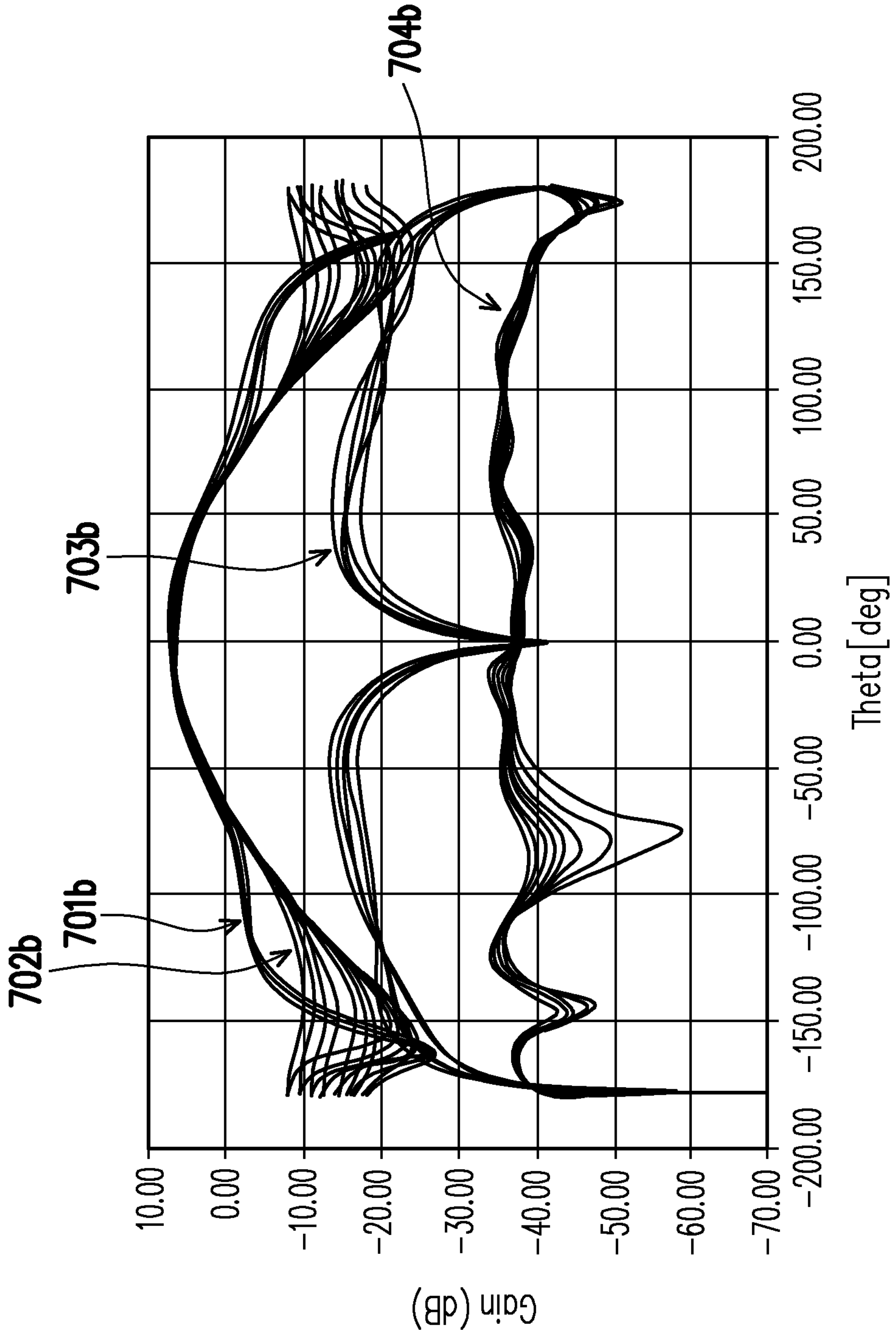
FIG. 7B is a schematic diagram of a radiation field pattern of the broadband linear polarization antenna structure of the disclosure.

Please refer to FIG. 7A and FIG. 7B. FIG. 7A is a schematic diagram of a radiation field pattern of the conventional antenna structure, and FIG. 7B is a schematic diagram of a radiation field pattern of the broadband linear polarization antenna structure of the disclosure.

In FIG. 7A, a curve 701*a* is a vertical main polarization field pattern of the conventional antenna structure, a curve 702*a* is a horizontal main polarization field pattern of the conventional antenna structure, a curve 703*a* is a horizontal cross polarization field pattern of the conventional antenna structure, and a curve 704*a* is a vertical cross polarization field pattern of the conventional antenna structure. In addition, in FIG. 7B, a curve 701*b* is a vertical main polarization field pattern of the broadband linear polarization antenna structure 100 of the disclosure, a curve 702*b* is a horizontal main polarization field pattern of the broadband linear polarization antenna structure 100 of the disclosure, a curve 703*b* is a horizontal cross polarization field pattern of the broadband linear polarization antenna structure 100 of the disclosure, and a curve 704*b* is a vertical cross polarization field pattern of the broadband linear polarization antenna structure 100 of the disclosure.

It can be seen from FIG. 7B that the horizontal polarization field patterns and the vertical polarization field patterns of the broadband linear polarization antenna structure 100 of the disclosure have similar beam widths, and each frequency maintains the main polarization field patterns and the cross polarization field patterns with high isolation. It can be seen that the broadband linear polarization antenna structure 100 of the disclosure has the broadband linear polarization operation characteristic.

In contrast, it can be seen from FIG. 7A that the conventional antenna structure can only maintain the linear polarization radiation field pattern at the center frequency, while the broadband linear polarization antenna structure 100 of the disclosure can maintain the broadband linear polarization characteristic.

Figure 8A:
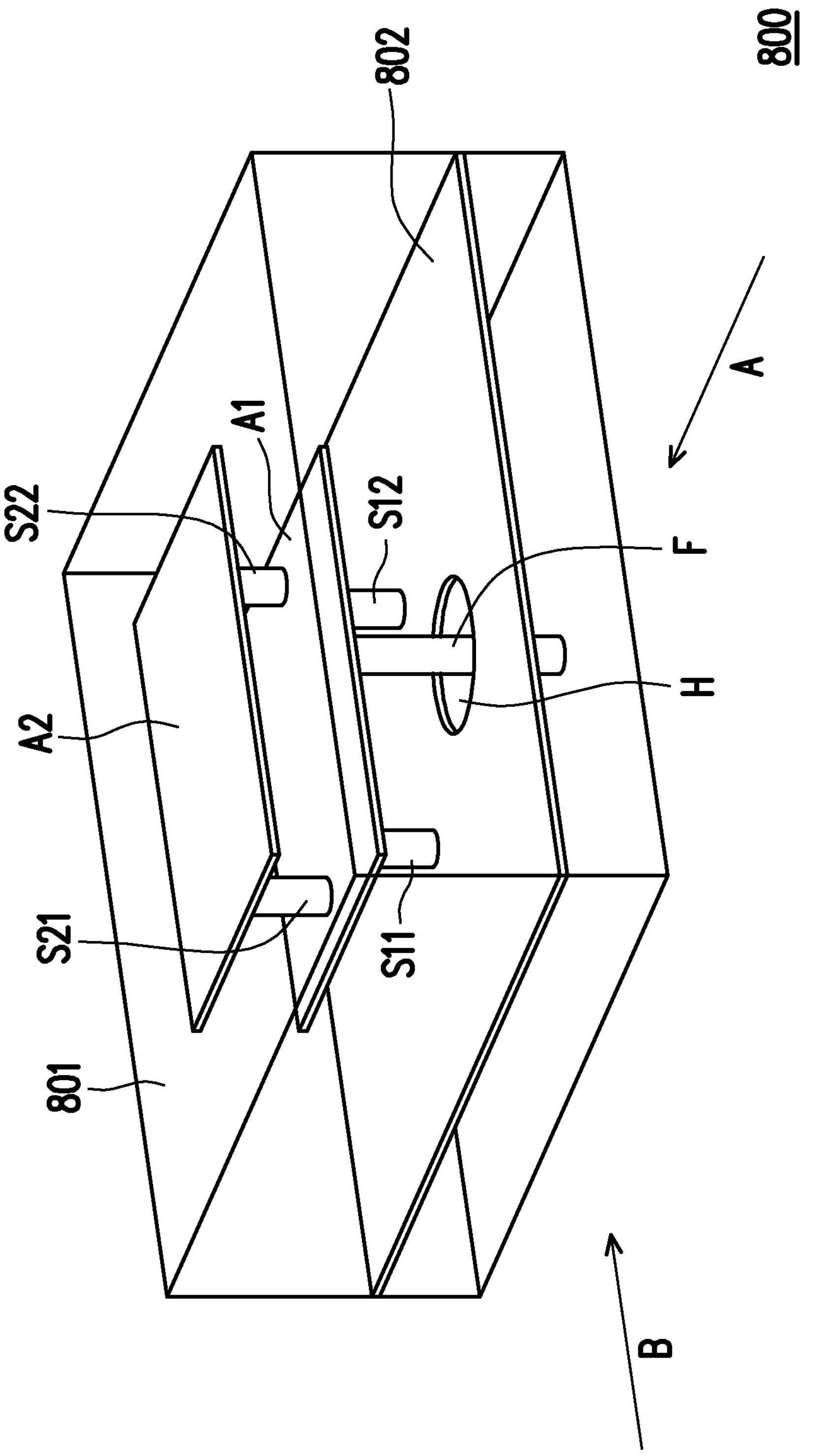
FIG. 8A is a schematic diagram of a broadband linear polarization antenna structure according to another embodiment of the disclosure.
Figure 8B:
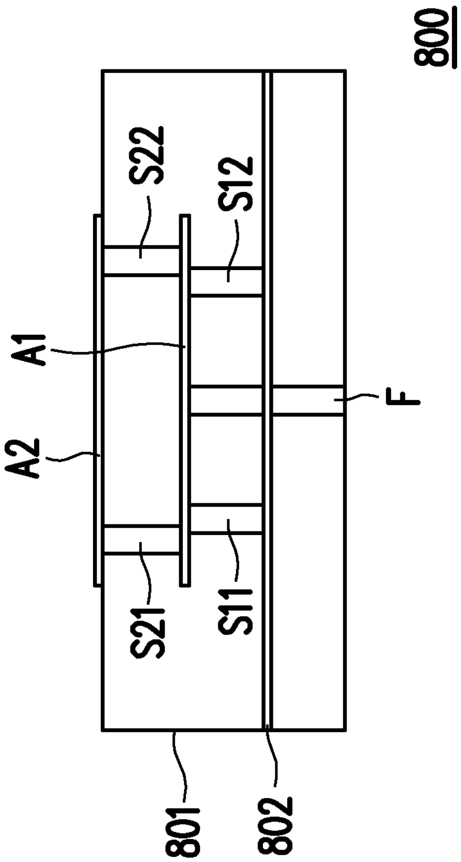
FIG. 8B is a side view of FIG. 8A at an angle of view A.
Figure 8C:
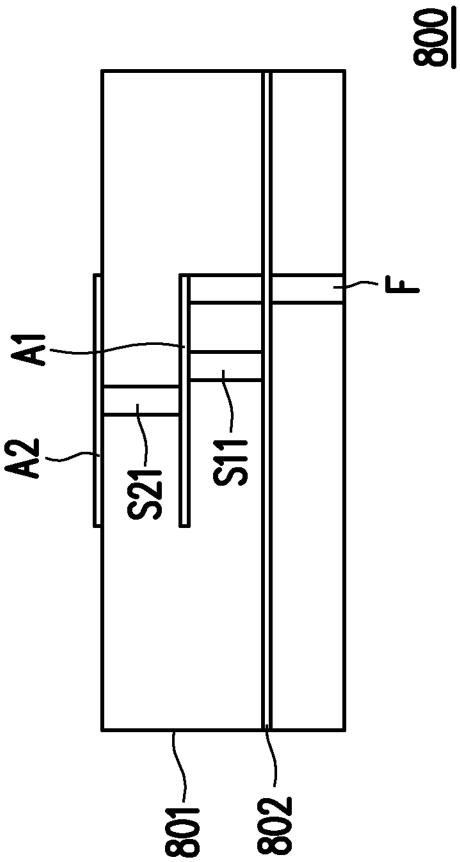
FIG. 8C is a side view of FIG. 8A at an angle of view B.
Figure 8D:
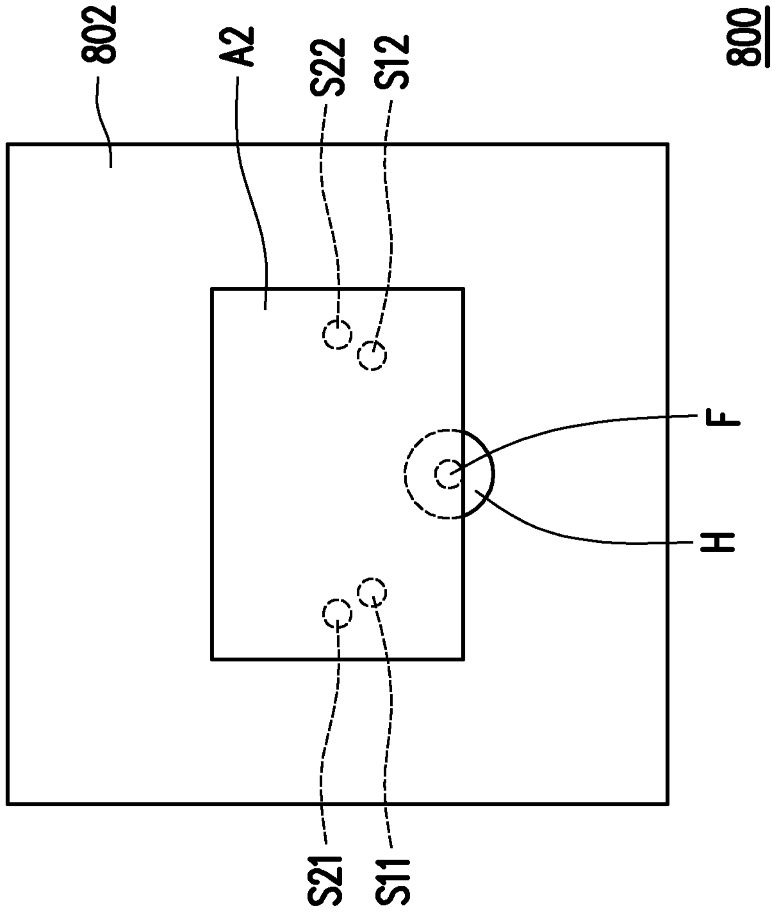
FIG. 8D is a top view of FIG. 8A.

Please refer to FIG. 8A to FIG. 8D. FIG. 8A is a schematic diagram of a broadband linear polarization antenna structure according to another embodiment of the disclosure, FIG. 8B is a side view of FIG. 8A at an angle of view A, FIG. 8C is a side view of FIG. 8A at an angle of view B, and FIG. 8D is a top view of FIG. 8A.

In the embodiment, the broadband linear polarization antenna structure 800 includes a reference conductive layer 802, a first patch antenna A1, a second patch antenna A2, and a feeding portion F. In an embodiment, the broadband linear polarization antenna structure 800 may further include a substrate 801, and the reference conductive layer 802, the first patch antenna A1, the second patch antenna A2, and the feeding portion F may be disposed in the substrate 801, but limited thereto. In some embodiments, the reference conductive layer 802 may be a layer connected with a reference voltage source providing a reference voltage. In the embodiment where the reference voltage is 0V, the reference conductive layer 802 may be understood as a ground layer, but the disclosure is not limited thereto.

As shown in FIG. 8A to FIG. 8D, the reference conductive layer 802 includes a through hole H. The through hole H may correspond to the feeding portion F. In an embodiment, the feeding portion F may penetrate the reference conductive layer 802 through the through hole H and be coupled to the first patch antenna A1.

In an embodiment, the feeding portion F may receive a feeding signal. The feeding signal is, for example, a single polarization feeding signal. In different embodiments, the feeding portion F may include a microstrip line or a coaxial feeding line. In some embodiments, the feeding portion F may be vertically, horizontally, or obliquely coupled to the first patch antenna A1, but not limited thereto.

In FIG. 8A to FIG. 8D, first short pins S11 and S12 are connected between the reference conductive layer 802 and the first patch antenna A1, and second short pins S21 and S22 are connected between the first patch antenna A1 and the second patch antenna A2.

In an embodiment, the first patch antenna A1 and the second patch antenna A2 may be parallel to each other, and the reference conductive layer 802 may be parallel to the first patch antenna A1. In other words, the first patch antenna A1, the second patch antenna A2, and the reference conductive layer 802 may be parallel to each other, but not limited thereto. In addition, the first patch antenna A1 may be disposed between the reference conductive layer 802 and the second patch antenna A2, but not limited thereto.

In addition, the first short pins S11 and S12, and the second short pins S21 and S22 may be perpendicular to the first patch antenna A1. In other words, the first short pins S11 and S12, and the second short pins S21 and S22 may be understood to be also perpendicular to the second patch antenna A2 and the reference conductive layer 802, but not limited thereto.

In addition, although only two first short pins S11 and S12 are shown in FIG. 8A to FIG. 8D, in some embodiments, more first short pins may be connected between the reference conductive layer 802 and the first patch antenna A1. Similarly, although only two second short pins S21 and S22 are shown in FIG. 8A to FIG. 8D, in some embodiments, more second short pins may be connected between the first patch antenna A1 and the second patch antenna A2, but not limited thereto.

In different embodiments, the first short pins S11 and S12 may be connected to any position of the first patch antenna A1. In a preferred embodiment, the first short pins S11 and S12 may be connected to a virtual ground of the first patch antenna A1. Similarly, the second short pins S21 and S22 may be connected to any position of the second patch antenna A2. In a preferred embodiment, the second short pins S21 and S22 may be connected to a virtual ground of the second patch antenna A2.

In other embodiments, the number of the first short pins S11 and S12 connected between the reference conductive layer 802 and the first patch antenna A1 may be the same as or different from the number of the second short pins S21 and S22 connected between the first patch antenna A1 and the second patch antenna A2.

In addition, each of the first patch antenna A1 and the second patch antenna A2 has a complete patch metal surface, and the shape of each of the first patch antenna A1 and the second patch antenna A2 may be implemented as a circular structure or a polygonal structure according to the requirements of the designer. In addition, the size of each of the first patch antenna A1 and the second patch antenna A2 may also be adjusted according to the respective required resonance frequencies. That is, the size of the first patch antenna A1 may correspond to a first resonance frequency of the first patch antenna A1, and the size of the second patch antenna A2 may correspond to a second resonance frequency of the second patch antenna A2, but not limited thereto.

In some embodiments, when the first patch antenna A1 and the second patch antenna A2 are excited, the broadband linear polarization antenna structure 800 may generate multimode resonance to synthesize a broadband response. In addition, in other embodiments, the designer may stack other patch antennas on the second patch antenna A2 to achieve a wider frequency response, but not limited thereto.

Figure 9A:
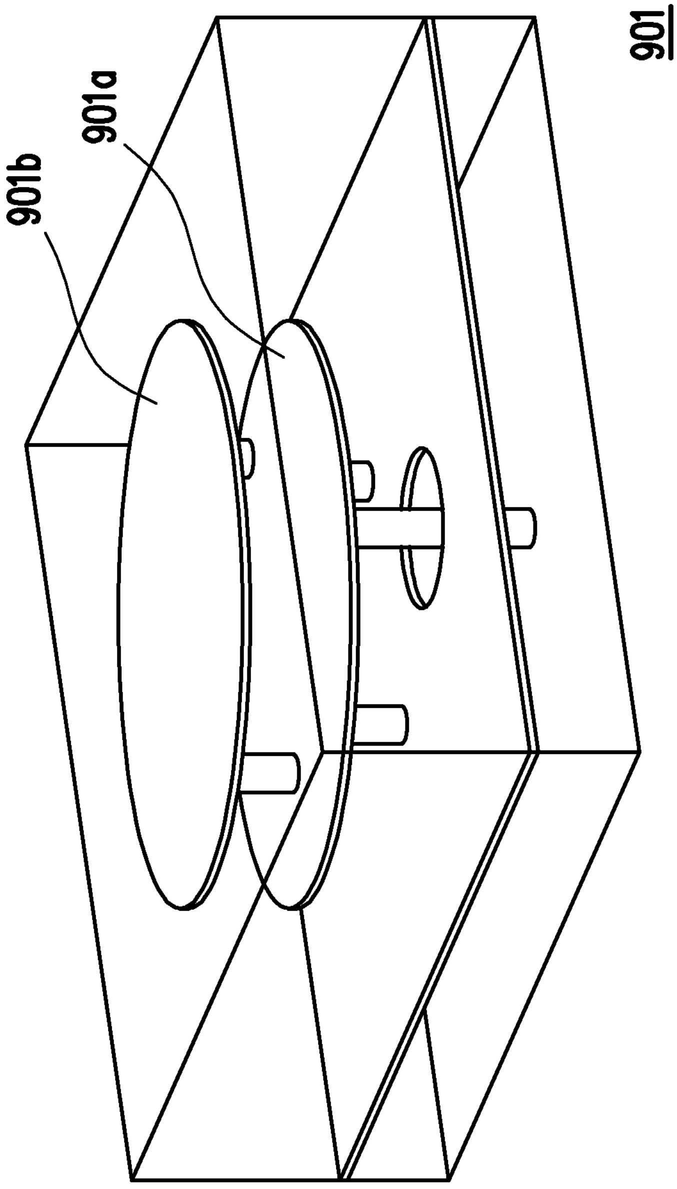
FIG. 9A to FIG. 9B are schematic diagrams of multiple broadband linear polarization antenna structures according to FIG. 8A.
Figure 9B:
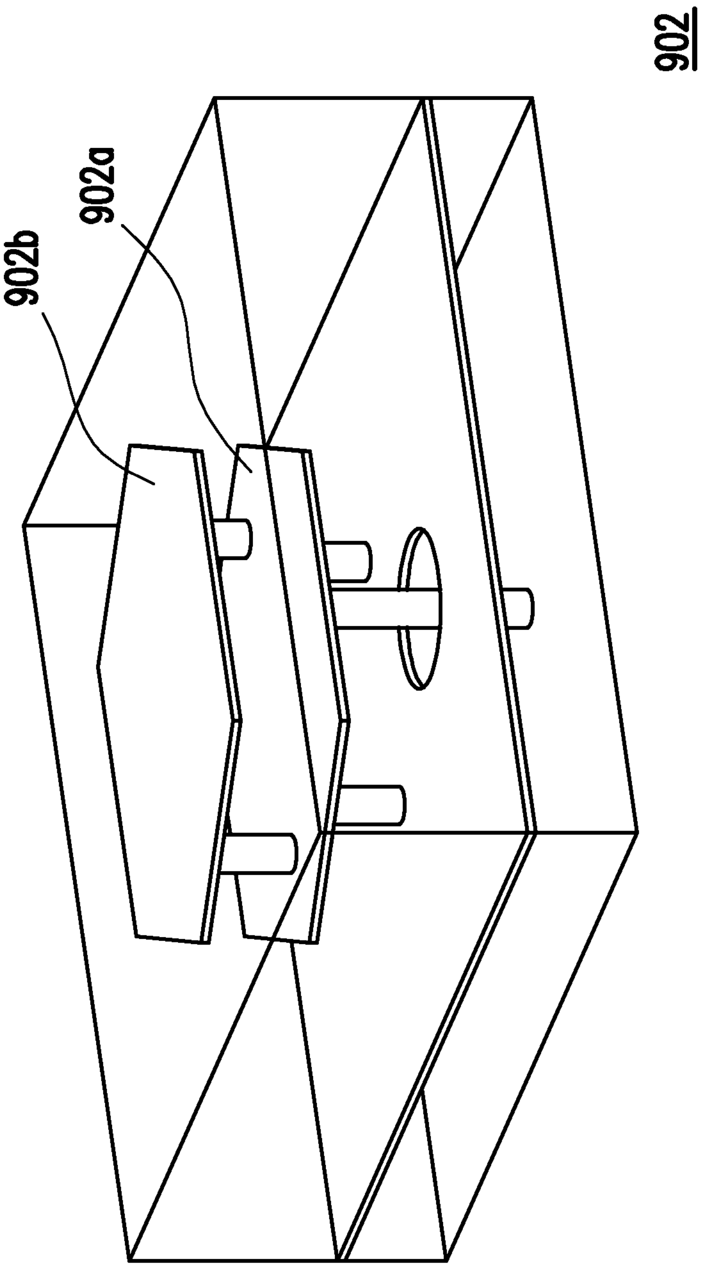

Please refer to FIG. 9A to FIG. 9B, which are schematic diagrams of multiple broadband linear polarization antenna structures according to FIG. 8A. In FIG. 9A, each of a first patch antenna 901*a* and a second patch antenna 901*b* of a broadband linear polarization antenna structure 901 has a circular structure. In FIG. 9B, each of a first patch antenna 902*a* and a second patch antenna 902*b* of a broadband linear polarization antenna structure 902 has a polygonal structure.

In the embodiment, except for the different shapes of the patch antennas, the structure/operation manners of the broadband linear polarization antenna structures 901 and 902 are similar to that of the broadband linear polarization antenna structure 800, so for details of the broadband linear polarization antenna structures 901 and 902, please refer to the related description of FIG. 8A to FIG. 8D, which will not be repeated here.

Figure 10:
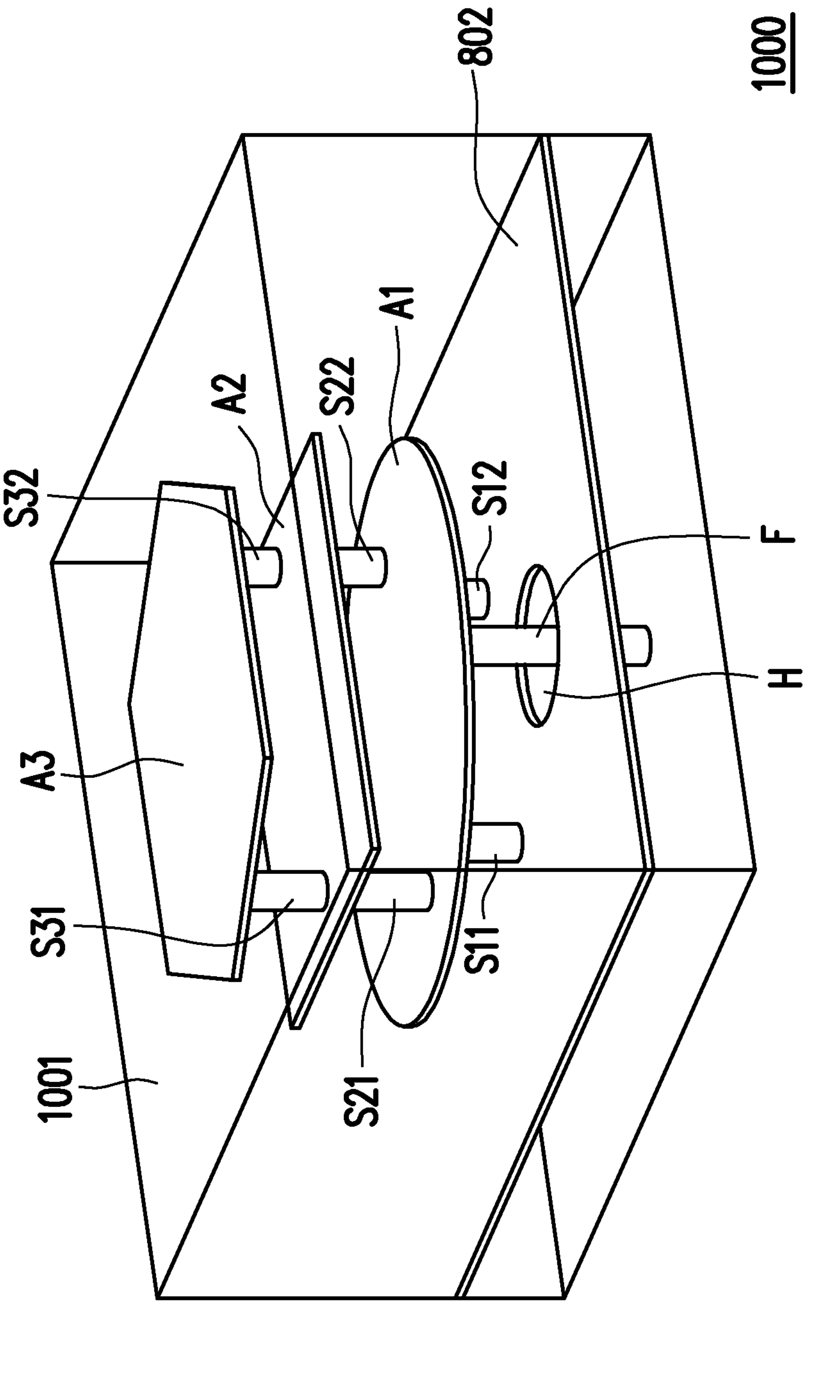
FIG. 10 is a schematic diagram of a broadband linear polarization antenna multilayer structure according to an embodiment of the disclosure.

Please refer to FIG. 10, which is a schematic diagram of a broadband linear polarization antenna multilayer structure according to an embodiment of the disclosure. In FIG. 10, a broadband linear polarization antenna structure 1000 includes a reference conductive layer 1002, a first patch antenna A1, a second patch antenna A2, a third patch antenna A3, and a feeding portion F. In an embodiment, the broadband linear polarization antenna structure 1000 may further include a substrate 1001, and the reference conductive layer 1002, the first patch antenna A1, the second patch antenna A2, the third patch antenna A3, and the feeding portion F may be disposed in the substrate 1001, but not limited thereto. In some embodiments, the reference conductive layer 1002 may be a layer connected with a reference voltage source providing a reference voltage. In the embodiment where the reference voltage is 0V, the reference conductive layer 1002 may be understood as a ground layer, but the disclosure is not limited thereto.

As shown in FIG. 10, the reference conductive layer 1002 includes a through hole H. The through hole H may correspond to the feeding portion F. In an embodiment, the feeding portion F may penetrate the reference conductive layer 1002 through the through hole H and be coupled to the first patch antenna A1.

In an embodiment, the feeding portion F may receive a feeding signal. The feeding signal is, for example, a single polarization feeding signal. In different embodiments, the feeding portion F may include a microstrip line or a coaxial feeding line. In some embodiments, the feeding portion F may be vertically, horizontally, or obliquely coupled to the first patch antenna A1, but not limited thereto.

In FIG. 10, first short pins S11 and S12 are connected between the reference conductive layer 1002 and the first patch antenna A1, second short pins S21 and S22 are connected between the first patch antenna A1 and the second patch antenna A2, and third short pins S31 and S32 are connected between the second patch antenna A2 and the third patch antenna A3.

In an embodiment, the first patch antenna A1, the second patch antenna A2, and the third patch antenna A3 may be parallel to each other, and the reference conductive layer 1002 may be parallel to the first patch antenna A1. In other words, the first patch antenna A1, the second patch antenna A2, the third patch antenna A3, and the reference conductive layer 1002 may be parallel to each other, but not limited thereto. In addition, the first patch antenna A1 may be disposed between the reference conductive layer 1002 and the second patch antenna A2, and the second patch antenna A2 may be disposed between the first patch antenna A1 and the third patch antenna A3.

In addition, the first short pins S11 and S12, the second short pins S21 and S22, and the third short pins S31 and S32 may be perpendicular to the first patch antenna A1. In other words, the first short pins S11 and S12, the second short pins S21 and S22, and the third short pins S31 and S32 may be understood to be also perpendicular to the second patch antenna A2, the third patch antenna A3, and the reference conductive layer 1002, but not limited thereto.

In addition, although only two first short pins S11 and S12 are shown in FIG. 10, in some embodiments, more first short pins may be connected between the reference conductive layer 1002 and the first patch antenna A1. Similarly, although only two second short pins S21 and S22 are shown in FIG. 10, in some embodiments, more second short pins may be connected between the first patch antenna A1 and the second patch antenna A2, but not limited thereto. In addition, although only two third short pins S31 and S32 are shown in FIG. 10, in some embodiments, more third short pins may be connected between the second patch antenna A2 and the third patch antenna A3, but not limited thereto.

In different embodiments, the first short pins S11 and S12 may be connected to any position of the first patch antenna A1. In a preferred embodiment, the first short pins S11 and S12 may be connected to a virtual ground of the first patch antenna A1. Similarly, the second short pins S21 and S22 may be connected to any position of the second patch antenna A2. In a preferred embodiment, the second short pins S21 and S22 may be connected to a virtual ground of the second patch antenna A2. In addition, the third short pins S31 and S32 may be connected to any position of the third patch antenna A3. In a preferred embodiment, the third short pins S31 and S32 may be connected to a virtual ground of the third patch antenna A3.

In other embodiments, the number of the first short pins S11 and S12 connected between the reference conductive layer 1002 and the first patch antenna A1 may be the same as or different from the number of the second short pins S21 and S22 connected between the first patch antenna A1 and the second patch antenna A2. In addition, the number of the third short pins S31 and S32 connected between the second patch antenna A2 and the third patch antenna A3 may be the same as or different from the number of the second short pins S21 and S22 connected between the first patch antenna A1 and the second patch antenna A2.

In addition, each of the first patch antenna A1, the second patch antenna A2, and the third patch antenna A3 has a complete patch metal surface, and the shape of each of the first patch antenna A1, the second patch antenna A2, and the third patch antenna A3 may be implemented as a circular structure or a polygonal structure according to the requirements of the designer. In addition, the size of each of the first patch antenna A1, the second patch antenna A2, and the third patch antenna A3 may also be adjusted according to the respective required resonance frequencies. That is, the size of the first patch antenna A1 may correspond to a first resonance frequency of the first patch antenna A1, the size of the second patch antenna A2 may correspond to a second resonance frequency of the second patch antenna A2, and the size of the third patch antenna A3 may correspond to a third resonance frequency of the third patch antenna A3, but not limited thereto.

In some embodiments, when the first patch antenna A1, the second patch antenna A2, and the third patch antenna A3 are excited, the broadband linear polarization antenna structure 1000 may generate multimode resonance to synthesize a broadband response. In addition, in other embodiments, the designer may stack other patch antennas on the third patch antenna A3 to achieve a wider frequency response, but not limited thereto.

In summary, through disposing one or more short pins between different patch antennas, the impedance of the broadband linear polarization antenna structure of the disclosure may be effectively adjusted, thereby implementing the broadband operation of the broadband linear polarization antenna structure. In addition, since each patch antenna of the broadband linear polarization antenna structure of the disclosure has a complete patch metal surface, the broadband linear polarization radiation characteristic can be maintained, which is fairly practical for the dual polarization array transceiver system today.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A broadband linear polarization antenna structure, comprising:

- a reference conductive layer, comprising at least one through hole;
- at least one first short pin;
- a first patch antenna, wherein the at least one first short pin is connected between the reference conductive layer and the first patch antenna;
- at least one second short pin, wherein each of the at least one second short pin has a first end and a second end, and each of the at least one first short pin is misaligned with each of the at least one second short pin;
- a second patch antenna, wherein the first end of each of the at least one second short pin is connected to the first patch antenna, and the second end of each of the at least one second short pin is connected to the second patch antenna; and
- at least one feeding portion, wherein each of the at least one feeding portion penetrates the reference conductive layer through the at least one through hole and is coupled to the first patch antenna but not coupled to the second patch antenna, wherein the second patch antenna is only directly coupled with the at least one second short pin and not directly coupled with the at least one first short pin, wherein the first patch antenna and the second patch antenna have different shapes.

2. The broadband linear polarization antenna structure according to claim 1, wherein the first patch antenna and the second patch antenna are parallel to each other.

3. The broadband linear polarization antenna structure according to claim 2, wherein the reference conductive layer is parallel to the first patch antenna.

4. The broadband linear polarization antenna structure according to claim 2, wherein each of the at least one first short pin and each of the at least one second short pins are perpendicular to the first patch antenna.

5. The broadband linear polarization antenna structure according to claim 1, wherein each of the at least one first short pin is connected to a virtual ground of the first patch antenna, and each of the at least one second short pin is connected to a virtual ground of the second patch antenna.

6. The broadband linear polarization antenna structure according to claim 1, the at least one feeding portion comprises a first feeding portion and a second feeding portion, and the at least one through hole comprises a first through hole and a second through hole respectively corresponding to the first feeding portion and the second feeding portion, wherein the first feeding portion penetrates the reference conductive layer through the first through hole and is coupled to the first patch antenna, the second feeding portion penetrates the reference conductive layer through the second through hole and is coupled to the first patch antenna, and the first feeding portion and the second feeding portion respectively receive a first feeding signal and a second feeding signal.

7. The broadband linear polarization antenna structure according to claim 6, wherein the first feeding signal is orthogonal to the second feeding signal.

8. The broadband linear polarization antenna structure according to claim 6, wherein a number of the at least one first short pin is one, and a number of the at least one second short pin is one.

9. The broadband linear polarization antenna structure according to claim 8, wherein the at least one first short pin is aligned with the at least one second short pin.

10. The broadband linear polarization antenna structure according to claim 1, the at least one feeding portion comprises a specific feeding portion, the at least one through hole comprises a specific through hole corresponding to the specific feeding portion, the specific feeding portion penetrates the reference conductive layer through the specific through hole and is coupled to the first patch antenna, and the specific feeding portion receives a specific feeding signal.

11. The broadband linear polarization antenna structure according to claim 10, wherein a number of the at least one first short pin is greater than one, and a number of the at least one second short pin is greater than one.

12. The broadband linear polarization antenna structure according to claim 1, wherein each of the first patch antenna and the second patch antenna has a complete patch metal surface.

13. The broadband linear polarization antenna structure according to claim 1, wherein the first patch antenna is disposed between the reference conductive layer and the second patch antenna.

14. The broadband linear polarization antenna structure according to claim 13, further comprising a third patch antenna, wherein the second patch antenna is disposed between the first patch antenna and the third patch antenna, and at least one third short pin is connected between the second patch antenna and the third patch antenna.

15. The broadband linear polarization antenna structure according to claim 1, wherein a number of the at least one first short pin is different from a number of the at least one second short pin.

16. The broadband linear polarization antenna structure according to claim 1, wherein a number of the at least one first short pin is the same as a number of the at least one second short pin.

17. The broadband linear polarization antenna structure according to claim 1, wherein a size of the first patch antenna corresponds to a first resonance frequency of the first patch antenna, and a size of the second patch antenna corresponds to a second resonance frequency of the second patch antenna.

18. The broadband linear polarization antenna structure according to claim 1, wherein each of the at least one feeding portion comprises a microstrip line or a coaxial feeding line and is perpendicular to the first patch antenna.

19. The broadband linear polarization antenna structure according to claim 1, wherein there is a first distance between the first patch antenna and the reference conductive layer, there is a second distance between the first patch antenna and the second patch antenna, and the first distance is equal to the second distance.

20. The broadband linear polarization antenna structure according to claim 1, wherein there is a first distance between the first patch antenna and the reference conductive layer, there is a second distance between the first patch antenna and the second patch antenna, and the first distance is not equal to the second distance.

21. The broadband linear polarization antenna structure according to claim 1, wherein each of the at least one feeding portion is coupled to the edge of the first patch antenna, and each of the first patch antenna and the second patch antenna has a circular structure or a polygonal structure.

* * * * *